(12) United States Patent
Khot et al.

(10) Patent No.: US 8,305,421 B2
(45) Date of Patent: Nov. 6, 2012

(54) AUTOMATIC DETERMINATION OF A CONFIGURATION FOR A CONFERENCE

(75) Inventors: Gautam Khot, Bangalore (IN); Prithvi Ranganath, Bangalore (IN); Raghuram Belur, Bangalore (IN); Sandeep Lakshmipathy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 658 days.

(21) Appl. No.: 12/493,862

(22) Filed: Jun. 29, 2009

(65) Prior Publication Data

US 2010/0328421 A1 Dec. 30, 2010

(51) Int. Cl.
*H04M 11/00* (2006.01)

(52) U.S. Cl. ................... 348/14.01; 709/204

(58) Field of Classification Search ..... 348/14.01–14.09
See application file for complete search history.

(56) References Cited

U.S. PATENT DOCUMENTS

| | | |
|---|---|---|
| 5,077,732 A | 12/1991 | Fischer et al. |
| 5,276,681 A | 1/1994 | Tobagi et al. |
| 5,365,265 A | 11/1994 | Shibata et al. |
| 5,374,952 A | 12/1994 | Flohr |
| 5,381,413 A | 1/1995 | Tobagi et al. |
| 5,392,223 A | 2/1995 | Caci |
| 5,446,735 A | 8/1995 | Tobagi et al. |
| 5,491,797 A | 2/1996 | Thompson et al. |
| 5,530,472 A | 6/1996 | Bregman et al. |
| 5,550,982 A | 8/1996 | Long et al. |
| 5,568,183 A | 10/1996 | Cortjens et al. |
| 5,572,583 A | 11/1996 | Wheeler et al. |
| 5,592,477 A | 1/1997 | Farris et al. |
| 5,617,539 A | 4/1997 | Ludwig et al. |
| 5,642,156 A | 6/1997 | Saiki |
| 5,657,096 A | 8/1997 | Lukacs |
| 5,689,553 A | 11/1997 | Ahuja et al. |
| 5,689,641 A | 11/1997 | Ludwig et al. |
| 5,737,011 A | 4/1998 | Lukacs |

(Continued)

FOREIGN PATENT DOCUMENTS

EP 1515515 A1 3/2005

(Continued)

OTHER PUBLICATIONS

E. F. Brown, J. O. Limb and B. Prasada; "A Continuous Presence Video Conferencing System"; National Telecommunications Conference Record; Dec. 1978; 5 pages; vol. 1.

(Continued)

*Primary Examiner* — Curtis Kuntz
*Assistant Examiner* — Maria El-Zoobi
(74) *Attorney, Agent, or Firm* — Meyertons Hood Kivlin Kowert & Goetzel, P.C.; Jeffrey C. Hood; Joel L. Stevens

(57) ABSTRACT

Determining a configuration for a conference. Input may be received specifying a plurality of devices for use in the conference. A configuration may be automatically determined for the plurality of devices for the conference. The configuration may be automatically determined based on the specified plurality of devices and may specify usage of the plurality of devices during the conference. The configuration may specify a first device of the plurality of devices as a control unit. Automatic determination may include obtaining information regarding capabilities of each of the plurality of devices, and creating the configuration based on the capabilities of each of the plurality of devices. Finally, the configuration may be displayed on a display device.

20 Claims, 13 Drawing Sheets

U.S. PATENT DOCUMENTS

| | | | |
|---|---|---|---|
| 5,751,338 | A | 5/1998 | Ludwig, Jr. |
| 5,764,277 | A | 6/1998 | Loui et al. |
| 5,859,979 | A | 1/1999 | Tung et al. |
| 5,867,495 | A | 2/1999 | Elliott et al. |
| 5,892,767 | A | 4/1999 | Bell et al. |
| 5,896,128 | A | 4/1999 | Boyer |
| 5,903,302 | A | 5/1999 | Browning et al. |
| 5,914,940 | A | 6/1999 | Fukuoka et al. |
| 5,940,372 | A | 8/1999 | Bertin et al. |
| 6,032,202 | A | 2/2000 | Lea et al. |
| 6,043,844 | A | 3/2000 | Bist et al. |
| 6,108,687 | A | 8/2000 | Craig |
| 6,147,988 | A | 11/2000 | Bartholomew et al. |
| 6,216,173 | B1 | 4/2001 | Jones et al. |
| 6,240,140 | B1 | 5/2001 | Lindbergh et al. |
| 6,253,247 | B1 | 6/2001 | Bhaskar et al. |
| 6,262,978 | B1 | 7/2001 | Bruno et al. |
| 6,343,313 | B1 * | 1/2002 | Salesky et al. ............. 709/204 |
| 6,353,681 | B1 | 3/2002 | Nagai et al. |
| 6,357,028 | B1 | 3/2002 | Zhu |
| 6,466,252 | B1 | 10/2002 | Miyazaki |
| 6,477,248 | B1 | 11/2002 | Bruhnke et al. |
| 6,480,823 | B1 | 11/2002 | Zhao et al. |
| 6,594,688 | B2 | 7/2003 | Ludwig et al. |
| 6,621,515 | B2 | 9/2003 | Matthews et al. |
| 6,633,324 | B2 | 10/2003 | Stephens, Jr. |
| 6,633,985 | B2 | 10/2003 | Drell |
| 6,674,457 | B1 | 1/2004 | Davies et al. |
| 6,693,661 | B1 | 2/2004 | Vanderwilt et al. |
| 6,697,341 | B1 | 2/2004 | Roy |
| 6,704,769 | B1 | 3/2004 | Comstock et al. |
| 6,714,635 | B1 | 3/2004 | Adams et al. |
| 6,757,005 | B1 | 6/2004 | Elbaz et al. |
| 6,774,928 | B2 | 8/2004 | Bruzzone |
| 6,816,904 | B1 | 11/2004 | Ludwig et al. |
| 6,909,708 | B1 | 6/2005 | Krishnaswamy et al. |
| 6,975,721 | B1 | 12/2005 | Nimri et al. |
| 7,009,943 | B2 | 3/2006 | O'Neil |
| 7,010,108 | B2 | 3/2006 | DelHoyo et al. |
| 7,016,341 | B1 | 3/2006 | Potter et al. |
| 7,023,465 | B2 | 4/2006 | Stephens, Jr. |
| 7,043,749 | B1 | 5/2006 | Davies |
| 7,054,933 | B2 | 5/2006 | Baxley et al. |
| 7,081,827 | B2 | 7/2006 | Addy |
| 7,082,402 | B2 | 7/2006 | Conmy et al. |
| 7,174,365 | B1 | 2/2007 | Even et al. |
| 7,683,923 | B2 | 3/2010 | Zhang et al. |
| 2002/0152440 | A1 | 10/2002 | Yona et al. |
| 2002/0159394 | A1 | 10/2002 | Decker et al. |
| 2002/0188731 | A1 | 12/2002 | Potekhin et al. |
| 2003/0058836 | A1 | 3/2003 | Even |
| 2003/0156697 | A1 | 8/2003 | Svercek |
| 2003/0174146 | A1 | 9/2003 | Kenoyer |
| 2004/0028035 | A1 | 2/2004 | Read |
| 2004/0037268 | A1 | 2/2004 | Reed |
| 2004/0042553 | A1 | 3/2004 | Elbaz et al. |
| 2004/0114612 | A1 | 6/2004 | Even et al. |
| 2004/0183897 | A1 | 9/2004 | Kenoyer et al. |
| 2004/0252695 | A1 | 12/2004 | Rasanen et al. |
| 2005/0198134 | A1 | 9/2005 | Kenoyer et al. |
| 2006/0045253 | A1 * | 3/2006 | Bieselin et al. .......... 379/202.01 |
| 2006/0106929 | A1 | 5/2006 | Kenoyer et al. |
| 2006/0256738 | A1 | 11/2006 | Kenoyer et al. |
| 2007/0263072 | A1 * | 11/2007 | Lochbaum et al. ....... 348/14.08 |
| 2009/0207233 | A1 * | 8/2009 | Mauchly et al. .......... 348/14.09 |
| 2009/0225152 | A1 * | 9/2009 | Saleh et al. ............... 348/14.08 |
| 2011/0087736 | A1 * | 4/2011 | Bieselin ..................... 709/204 |

FOREIGN PATENT DOCUMENTS

| | | |
|---|---|---|
| WO | 9953719 | 10/1999 |

OTHER PUBLICATIONS

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems; 1996; pp. 160-170.

P. Galvez, H. Newman, C. Isnard and G. Denis; "Networking, Videoconferencing and Collaborative Environments"; Computer Physics Communications; May 1998; pp. 43-50; vol. 110, Issue 1-3.

Tohru Hoshi, Kenjiro Mori, Yasuhiro Takahashi Yoshiyuki Nakayama, and Takeshi Ishizaki; "B-ISDN Multimedia Communication and Collaboration Platform Using Advanced Video Workstations to Support Cooperative Work"; IEEE Journal on Selected Areas in Communications; Dec. 1992; pp. 1403-1412; vol. 10, No. 9.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.

Aurel A. Lazar, Koon-Seng Lim and Franco Marconcini; "xbind: The System Programmer's Manual"; Technical Report; Jun. 1996; 69 pages; Center for Telecommunications Research; Columbia University, New York.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Steven McCanne; "Scalable Multimedia Communication with Internet Multicast, Light-weight Sessions, and the Mbone"; 1998; 32 pages; University of California Berkeley.

Leysia Palen; "Social, Individual and Technological Issues for Groupware Calendar Systems" Conference on Human Factors in Computing Systems; 1999; pp. 17-24.

Roderick E. Perkins; "Spider: Investigation in Collaborative Technologies and Their Effects on Network Performance"; Global Telecommunications Conference; Dec. 1991; pp. 2074-2080; vol. 3.

Wilko Reinhardt; "Advance Reservation of Network Resources for Multimedia Applications"; Proceedings of the Second International Workshop on Multimedia: Advanced Teleservices and High-Speed Communication Architectures; 1994; pp. 23-33.

Shaker Sabri and Birendra Prasada; "Video Conferencing Systems"; Proceedings of the IEEE; Apr. 1985; pp. 671-688; vol. 74, Issue 4.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

"How Glowpoint Works", <http://web.archive.org/web/20031008073034/www.glowpoint.com/pages/about/how.html>, web archive dated Oct. 8, 2003; 1 page.

Aurel A. Lazar and Koon-Seng Lim; "Programmability and Service Creation for Multimedia Networks"; Fifth IEEE International Symposium on High Performance Distributed Computing; 1996; pp. 217-223.

Elan Amir, Steven McCanne, and Hui Zhang; "An Application Level Video Gateway"; In Proceedings of ACM Multimedia '95; 1995; 18 pages.

"Tunnel: A simple UDP/TCP tunnel application"; <www.tunnel.mrq3.com> from web archive: <http://web.archive.org/web/20040901071149/http://tunnel.mrq3.com/>, dated 2004; 2 pages.

"A history of video conferencing (VC) technology" <http://web.archive.org/web/20030622161425/http://myhome.hanafos.com/~soonjp/vchx.html> (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; <http://www.video.ja.net/intro/>; 2001; 26 pages.

Louis C. Yun and David G. Messerschmitt; "Architectures for Multi-Source Multi-User Video Compositing"; 1993; 9 pages; University of California at Berkley, Berkley CA.

"Conferencing Service Provision—How Ridgeway IP Freedom Helps the CSP"; 2002; 4 pages; Ridgeway Systems and Software Ltd.

"Deploying H.323 Conferencing on Your IP Network—Seeing, Hearing, and Sharing Across Networks"; First Virtual Communications Technical White Paper; 2000; 11 pages.

"Eye-to-Eye Video"; Retrieved from the Internet: <http://itotd.com/articles/254/eye-to-eye-video/>; Jul. 23, 2004; 6 pages.

"H.264 FAQ"; Retrieved from the Internet: <http://www.apple.com/mpeg4/h264faq.html>; 2005; 2 pages.

"IPfreedom—Enabling end-to-end IP Voice (VoIP) and Video communications by securely traversing firewalls and NATs"; Glowpoint Case Study; 2003; 4 pages; Ridgeway Systems & Software, Inc.

Victor Paulsamy and Samir Chatterjee; "Network Convergence and the NAT/Firewall Problems"; Proceedings of the 36th Hawaii International Conference on System Sciences; Jan. 2003; 10 pages.

"Personal videoconferencing from the desktop is better than ever" <http://web.archive.org/web/20041009174345/www.wireone.com/products_desktop.php> (web archive dated Oct. 9, 2004) (Copyright 2003); 2 pages.

"Radvision Firewall Cookbook"; Manual; Jan. 2002; 26 pages; Radvision.

Ira M. Weinstein; "Security for Videoconferencing: A guide to understanding, planning, and implementing secure compliant ISDN & IP videoconferencing solutions"; Jan.-Feb. 2004; 16 pages; Wainhouse Research.

"Traversing Firewalls and NATs With Voice and Video Over IP"; Whitepaper; Apr. 2002; 14 pages; Wainhouse Research, LLC & Ridgeway Systems and Software, Inc.

"Traversing Firewalls with Video over IP: Issues and Solutions" VCON Visual Communications, Whitepaper, Aug. 2003; 8 pages.

"V-Span" <http://web.archive.org/web/20040806213948/www.vspan.com/html/managedservices/vbm/index.html> (web archive dated Aug. 6, 2004); 2 pages.

E. J. Addeo, A. D. Gelman and A. B. Dayao; "A Multi-media Multi-point Communication Services Capability for Broadband Networks"; Mar. 1987; pp. 423-428; Bell Communications Research; Morristown, NJ.

E. J. Addeo, A.D. Gelman and A.B. Dayao; "Personal Multi-media Multi-point Communication Services for Broadband Networks", Global Telecommunications Conference and Exhibition; Nov.-Dec. 1988 pp. 53-57; vol. 1.

Elan Amir, Steven McCanne and Randy Katz; "Receiver-driven Bandwidth Adaptation for Light-weight Sessions"; Proceedings of the fifth ACM international conference on Multimedia; 1997; pp. 415-426; Berkeley, CA.

"Procedures for establishing communication between three or more audiovisual terminals using digital channels up to 1920 kbit/s" ITU-T H.243 (Feb. 2000); International Telecommunication Union; 62 pages; Geneva, Switzerland.

"Multipoint control units for audiovisual systems using digital channels up to 1920 kbit/s"; ITU-T H.231 (Jul. 1997) International Telecommunication Union; 21 pages.

"Polycom Executive Collection"; Jun. 2003; 4 pages; Polycom, Inc.; Pleasanton, CA.

Apple Computer, Inc. "Apple 'Open Sources' Rendevous," Press Release, Sep. 25, 2002, Cupertino, California, Apple.com.

Stephan Somogyi, "Apple's Rendezvous: What it is and why it matters," Article, Aug. 28, 2002, CNET Networks, Inc., online at <http://review.zdnet.com/4520-6033_16-4207554.html>.

U.S. Appl. No. 11/858,342, entitled "Videoconferencing System Discovery", by Matthew K. Brandt, filed Sep. 20, 2007.

Sanjay Agrawal, Surajit Chaudhuri, Gautam Das, and Aristides Gionis; "Automated Ranking of Database Query Results"; Proceedings of the 2003 CIDR Conference; 12 pages.

"Codian Management Platform Director"; Codian; 2007; 2 pages.

"Polycom Converged Management Application (CMA) 4000"; Polycom; 2009; 2 pages.

"Tandberg Video and Telepresence Management Suite"; Tandberg; Accessed from Internet on Jun. 16, 2010: <http://www.tandberg.com/video-telepresence-management.jsp>; 2 pages.

"Tandberg Management Suite"; Tandberg; Sep. 2009; 2 pages.

* cited by examiner

Selected Devices:

| | | | | |
|---|---|---|---|---|
| 10.95.11.119 – 119 | | | | |
| 10.10.33.111 – Conference Room | auto | | incoming | |
| 10.95.11.116 – 116 | auto | | incoming | |
| 10.95.11.107 – Team 200 - 107 | auto | | incoming | |
| 10.95.11.105 – LS105 | auto | | incoming | |
| 10.95.11.104 – Room 104 | auto | | incoming | |

AUTOMATIC DETERMINATION OF A CONFIGURATION FOR A CONFERENCE

FIELD OF THE INVENTION

The present invention relates generally to conferencing and, more specifically, to a system and method for automatic determination of a configuration for a conference.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant. Each videoconferencing system may also include a display and speaker to reproduce video and audio received from one or more remote participants. Each videoconferencing system may also be coupled to (or comprise) a general purpose computer system to allow additional functionality into the videoconference. For example, additional functionality may include data conferencing (including displaying and/or modifying a document for both participants during the conference).

Similarly, audioconferencing (e.g., teleconferencing) may allow two or more participants at remote locations to communicate using audio. For example, a speakerphone may be placed in a conference room at one location, thereby allowing any users in the conference room to participate in the audioconference with another set of participant(s) (e.g., in one or more other conference rooms with a speakerphone).

Current conferencing systems or software allow users to schedule conferences. However, specifying configurations for such conferences is often difficult. Correspondingly, improvements in conferencing systems are desired.

SUMMARY OF THE INVENTION

Various embodiments are presented of a method for automatically determining a configuration for a conference. Note that the method may be implemented as a computer program (e.g., program instructions stored on a computer accessible memory medium that are executable by a processor), a conferencing system (e.g., a videoconferencing system or an audioconferencing system), a computer system, etc.

Initially, input, e.g., user input, may be received which specifies a plurality of devices for use in a conference (e.g., a videoconference, an audioconference, etc.).

A configuration of the plurality of devices may then be automatically determined for the videoconference. The configuration may be automatically determined based on the specified plurality of devices and may specify usage of the plurality of devices during the videoconference. For example, the configuration may specify a first device of the plurality of devices as a control unit.

Automatic determination of the configuration may include obtaining information regarding capabilities of each of the plurality of devices and correspondingly creating the configuration based on the capabilities of each of the plurality of devices.

After determining or generating the configuration, the configuration may be provided for display for review by a user. The configuration may be displayed in a tree structure, e.g., where the first device is shown as a root node of the tree structure and one or more other devices are displayed as leaf nodes of the tree structure. Additionally, the tree structure may include one or more folder icons which may contain or hold other icons corresponding to other devices, as desired.

In some embodiments, further information may be displayed. For example, the configuration may indicate cost information for the configuration, e.g., for the entire configuration or for individual selections or choices made for various ones (or all) of the devices. Additionally, the proximity of the devices may be indicated for at least a subset of the devices. For example, a map may be displayed indicating where the devices are in relation to each other, or indications may be provided for those devices that are physically nearest each other (e.g., in the same building). The configuration may also indicate (e.g., when displayed) schedule conflicts of participants or devices scheduled for the conference and/or other types of conflicts, as described herein.

However, further input may be received to perform various actions. For example, user input may be received requesting a different configuration, and correspondingly, a different configuration may be automatically determined for the conference. Further, input may be received specifying a second device as the control unit, e.g., instead of or in addition to the first device. Correspondingly, the method may automatically determine a new configuration based on the received input.

The conference may be performed according to the determined or specified configuration. During the conference, status information may be provided for each of the plurality of devices, e.g., on a display.

BRIEF DESCRIPTION OF THE DRAWINGS

A better understanding of the present invention may be obtained when the following detailed description is considered in conjunction with the following drawings, in which:

FIGS. 4-14 are exemplary screen shots corresponding to the method illustrated in FIG. 3.

Figure 1:
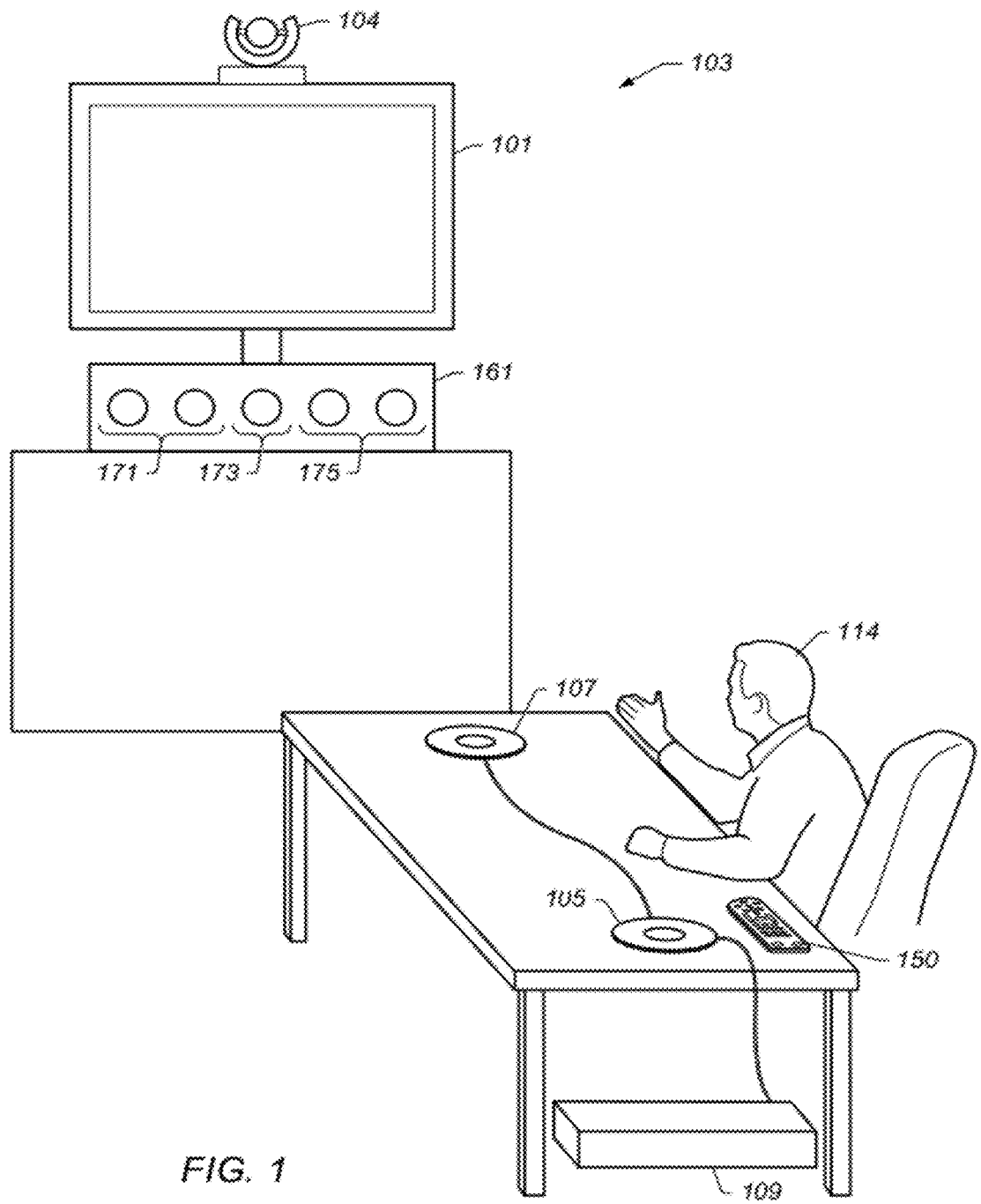
FIG. 1 illustrates a videoconferencing system participant location, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Patent Application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. Provisional Patent Application Ser. No. 61/147,672, titled "Conferencing System Utilizing a Mobile Communication Device as an Interface", filed on Jan. 27, 2009, whose inventors are Keith C. King and Matthew K. Brandt, is hereby incorporated by reference in its entirety as though fully and completely set forth herein.

FIG. 1—Exemplary Participant Location

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant or user through the user input components (e.g., buttons) on the speakerphones 105/107 and/or remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with a network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system with a video camera, microphone and/or speakers). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

Note that the videoconferencing system shown in FIG. 1 may be modified to be an audioconferencing system. The audioconferencing system, for example, may simply include speakerphones 105/107, although additional components may also be present. Various embodiments described herein describe the use of a mobile communication device as an interface to the conferencing system. Additionally, note that any reference to a "conferencing system" or "conferencing systems" may refer to videoconferencing systems or audioconferencing systems (e.g., teleconferencing systems).

Figure 2A:
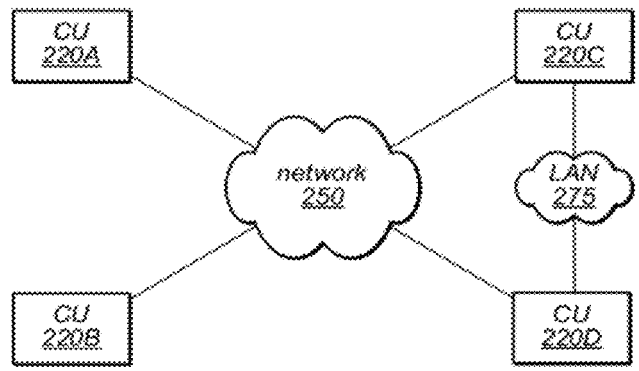
FIGS. 2A and 2B illustrate an exemplary mobile communication device and speaker phone, according to an embodiment.
Figure 2B:
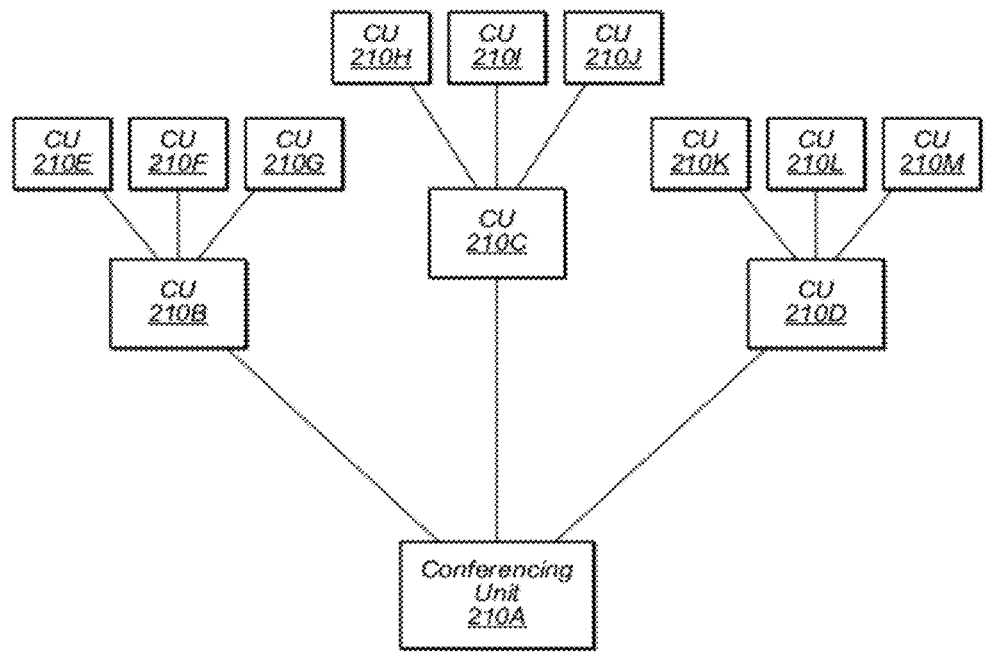

FIGS. 2A and 2B—Coupled Conferencing Systems

FIGS. 2A and 2B illustrate different configurations of conferencing systems. As shown in FIG. 2A, conferencing systems (CUs) 220A-D (e.g., videoconferencing systems 103 described above) may be connected via network 250 (e.g., a wide area network such as the Internet) and CU 220C and 220D may be coupled over a local area network (LAN) 275. The networks may be any type of network (e.g., wired or wireless) as desired.

FIG. 2B illustrates a relationship view of conferencing systems 210A-210M. As shown, conferencing system 210A may be aware of CU 210B-210D, each of which may be aware of further CU's (210E-210G, 210H-210J, and 210K-210M respectively). CU 210A may be operable to automatically determine a configuration for a conference according to the methods described herein, among others. In a similar manner, each of the other CUs shown in FIG. 2B, such as CU 210H, may be able to also automatically determine configurations for a conference, as described in more detail below. Similar remarks apply to CUs 220A-D in FIG. 2A.

Figure 3:
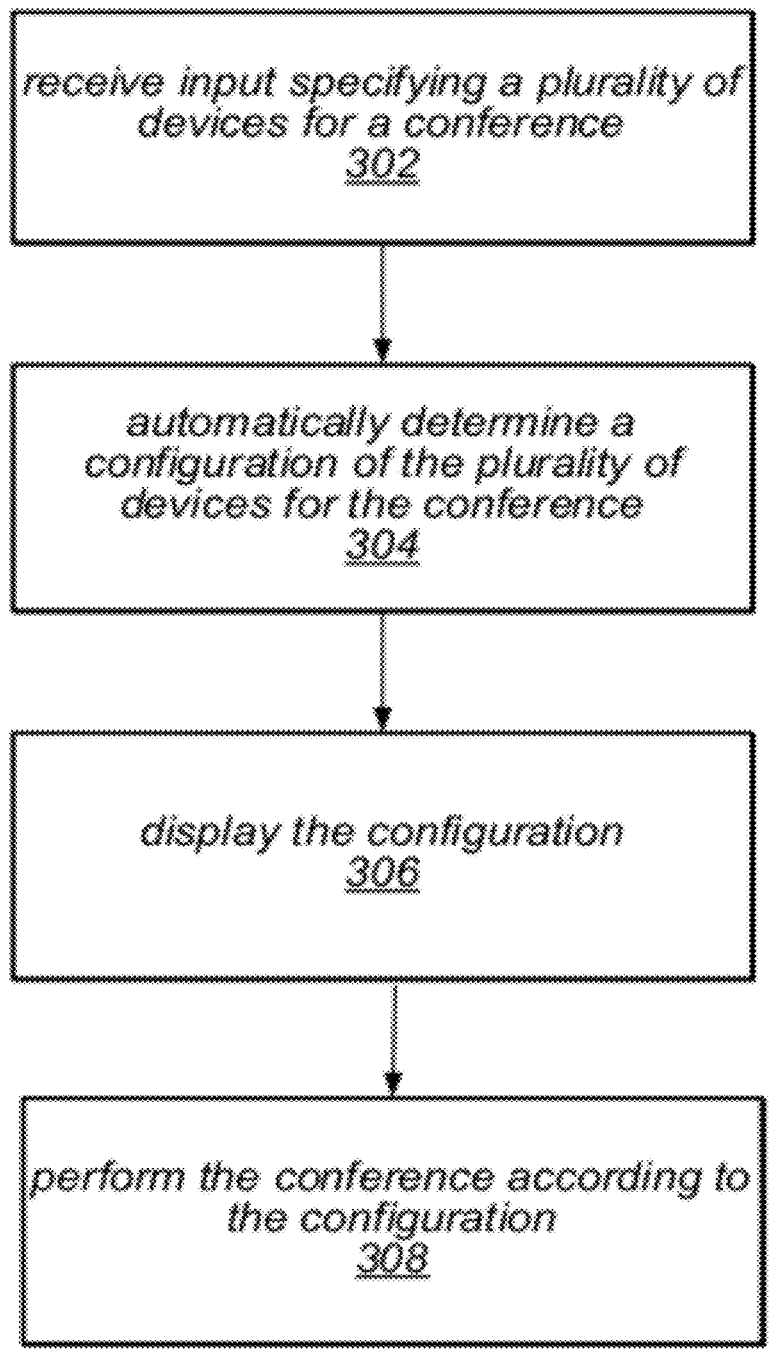
FIG. 3 is a flowchart diagram illustrating an exemplary method for automatically determining a configuration for a conference, according to an embodiment.

FIG. 3—Automatic Determination of a Configuration for a Conference

FIG. 3 illustrates a method for automatically determining a configuration for a conference. The method shown in FIG. 3 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 302, scheduling information for a conference may be stored. The scheduling information may specify a desired time (and date, if necessary) for the conference (e.g., a videoconference or audioconference). The scheduling information may also specify that a conference is desired among a plurality of participants, i.e., at least one user wishes to have a conference with one or more other users at a desired time. Thus, the scheduling information may specify a conference at the desired time for a plurality of participants. In one embodiment, the desired time may be specified and/or agreed upon by all of the plurality of participants. However, in alternate embodiments, a single user may provide the scheduling information (e.g., requesting the other participants) and those other participants may choose to accept the invitation and/or join the conference at the desired time. However, in some embodiments, the user scheduling the conference may not be a participant in the conference.

The scheduling information may be stored in response to user input (e.g., from the participant, or any of the participants being scheduled) specifying the scheduling information, possibly over a network. Thus, in one embodiment, a user may provide the scheduling information, e.g., to a particular conferencing system over a network, possibly using a scheduling client, such as a web browser that interfaces to an application on a server, or alternatively a software application.

The scheduling information may specify a plurality of devices, e.g., conferencing systems for the conference. Each of the plurality of devices may correspond to one or more participants of the conference. For example, each participant may have or use a respective conferencing system, and the scheduling information may specify each of those conferencing systems. However, it may be possible that two of the participants may share a conferencing system for the conference at the desired time. Alternatively, or additionally, the scheduling information may simply specify the participants. Note that at least two conferencing systems may be used for the conference at the desired time. In one embodiment, the user providing the scheduling information provides the names of the desired participants, and the software determines the appropriate numbers/IP addresses (conference systems) to dial to place the various calls to establish the conference, e.g., using a directory. Thus, in 302, a plurality of participants and/or devices may be specified, e.g., by a user, for a conference.

In 304, a configuration of the plurality of devices may be automatically determined for the conference. As used herein "automatic", at least in reference to the "automatic determination" of 304, refers to a software program executing to determine the configuration for the conference without requiring any manual user input specifying the configuration. For example, while the automatic determination may be initiated in response to user input (e.g., selecting a "configure" button in a graphical user interface, or alternate methods), the user does not manually specify the configuration for the conference. Rather, the configuration is specified automatically by software.

The configuration may specify usage of the plurality of devices for the conference, e.g., how the devices will be used during the conference. For example, the configuration may specify a first conferencing unit (or dedicated MCU) as a controller or control unit of the conference. However, it may be possible that the configuration may specify a plurality of devices as controllers for the conference, e.g., for distributed control of the conference.

Automatically determining the configuration for the plurality of devices may include (automatically) obtaining information regarding capabilities or properties of each (or at least a subset) of the plurality of devices and then creating the configuration based on the determined capabilities or properties. In other words, the information regarding capabilities or properties of the various devices may be automatically determined by a software program, rather than requiring manual user input to provide this information. For example, the method (e.g., the scheduling software or conferencing system used to create the scheduled conference) may determine or otherwise receive information regarding the bandwidth capabilities of each specified device, display capabilities, audio capabilities, processing capabilities, latency, etc., and then may generate a configuration which is appropriate to the capabilities of the devices. For example, a device that has low bandwidth or processing power may not be selected as the control unit for the conference. Similarly, proximity information may be used for determining the configuration. For example, it may be desirable, e.g., due to latency, for a device that is closest to most or all of the devices to act as the control unit.

In further embodiments, the configuration may be automatically determined based on specified parameters (e.g., which may be pre-configured, or selected by the user at the time of automatic determination). For example, the user may indicate that he would like a configuration that minimizes cost of the conference. Alternatively, the user may indicate that video quality or audio quality, latency, etc. should be maximized. The user may also specify a plurality of different parameters to optimize for, and/or may prioritize the list of parameters. Thus, the user may indicate the type of optimized configuration he would like, and the method may generate the configuration based on that input. As another example of a specified parameter, the user may indicate that a specific device should be used as the control unit, the configuration may be automatically generated based on that specification. Other types of parameters are envisioned. FIGS. 4-14, described below, provide various configuration examples.

In 306, the configuration may be displayed. For example, the configuration may be displayed as a tree structure, although other visual structures are envisioned. In such a tree structure, any devices specified or determined to be used as a control unit may be displayed as root nodes of the tree structure. The other devices may be displayed as leaf nodes, e.g., which branch from the root nodes, as indicated by the configuration. Thus, each device that is configured to be controlled by a corresponding controlling device may be displayed as a leaf node from that controlling device's root node. In various embodiments, the tree may include other icons, such as folder icons which are able to hold other icons (e.g., leaf nodes), possible in a collapsible manner (e.g., where the folder can be opened to show the containing objects, or closed to not show such objects).

The configuration may indicate various parameters or information related to the individual devices or the scheduled conference. For example, in one embodiment, the configuration may indicate physical proximity information for at least a subset of the devices. Similarly, schedule conflicts of a proposed conference or configuration may be indicated when displaying the configuration. Other information may also be indicated. For example, where a particular video format is selected, and one of the selected participants/devices is not compatible with the video format, such conflicts may be indicated in the configuration. Various other conflicts may also be indicated, e.g., related to audio formats, bandwidth, processing, etc.

In further embodiments, the configuration may be modified, e.g., by the user or automatically, as desired. For example, the user may be able to modify any of the configuration or properties of the configurations. In one embodiment, the user may specify a device as a (e.g., the) control unit for the conference, e.g., instead of the first device. However, the user may be able to modify other portions of the configuration (e.g., placements of leaf nodes, type of connection, format of video, etc.). In various embodiments, the modifications may be specified on an individual device level or in a bulk (i.e., more than one) device fashion. For example, the user may be able to move or modify an entire branch of devices (e.g., removing or connecting to different roots or parent nodes of the configuration).

Additionally, the user may be able to resolve various conflicts indicated in the configuration, e.g., by selecting the conflict and selecting a new parameter or configuration to resolve the conflict. The method may make suggestions to the user to resolve the identified conflicts, as desired. Thus, the displayed configuration may be used to resolve conflicts.

In further embodiments, the user may provide input requesting a specific change (e.g., such as a different control unit, following embodiments from above), and the method may automatically determine a configuration based on the specified requirements. Note that such requirements may be specified originally, e.g., before the determination in 304, as desired.

Alternatively, or additionally, the user may request another configuration that is different than the current configuration, e.g., by selecting (or reselecting) a "configure" button in a GUI. In such embodiments, the method may automatically generate a new, different configuration based on the user input. In one embodiment, similar to embodiments above, the user may specify various parameters for the automatically configuration, e.g., for limiting cost, optimizing performance, optimizing video or audio quality, etc.

In 308, the conference may be initiated and/or performed according to the configuration. In some embodiments, during the conference, status information of each (or at least one of) the devices of the conference may be provided, e.g., displayed on a display. The status information may be provided in the displayed configuration, e.g., in the tree structure described above, as desired.

FIGS. 4-14: Exemplary Screen Shots According to the Method of FIG. 3

FIGS. 4-14 are exemplary screen shots corresponding to the method of FIG. 3, according to various embodiments. These Figures (and their corresponding descriptions) may apply to any of the systems and methods described above.

Figure 4:
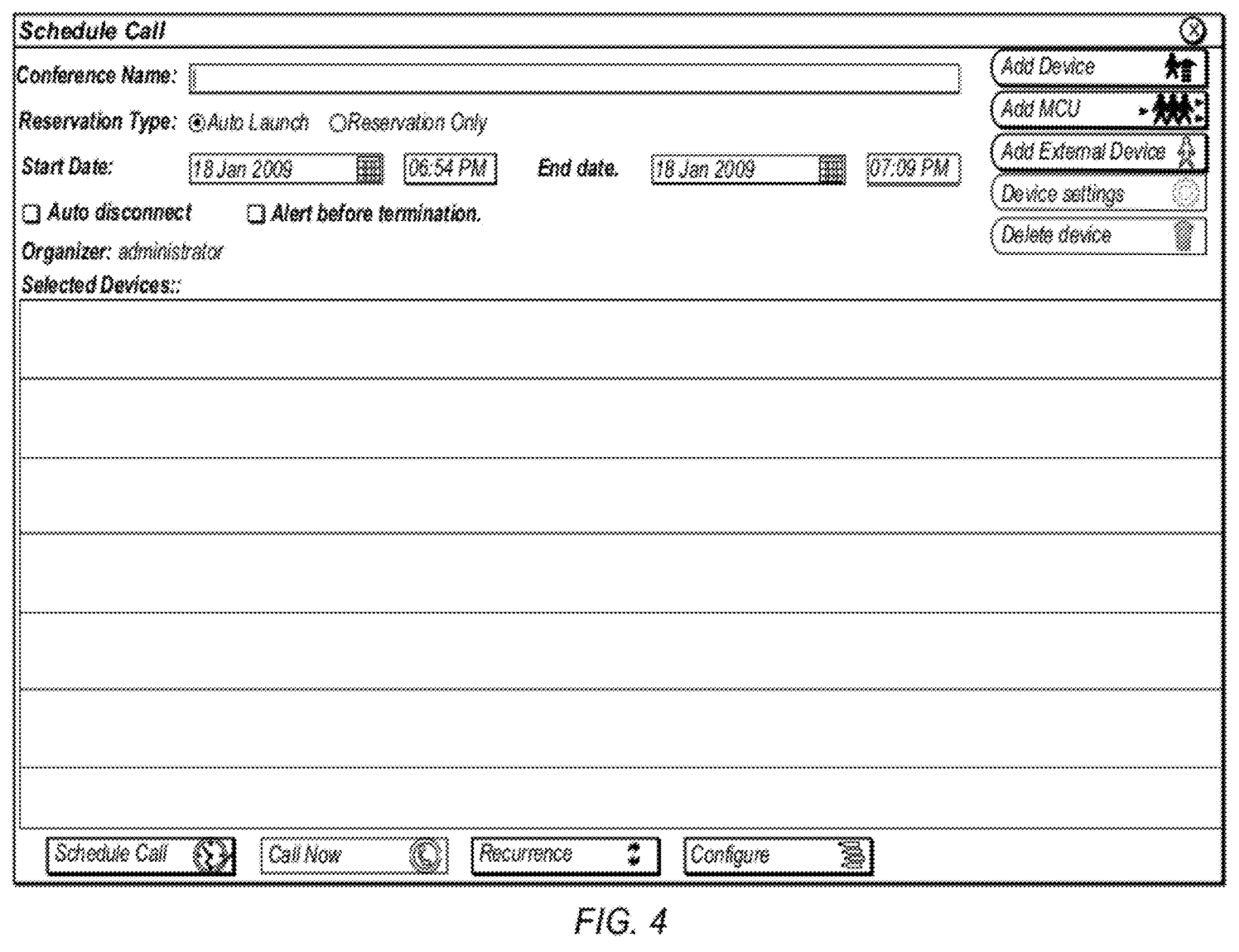

As shown, FIG. 4 illustrates an exemplary scheduling GUI. A user may schedule a conference (e.g., a videoconference or audioconference), including the start date, start time, end date, end time, and other parameters. The user may also provide a conference name, a reservation type (e.g., auto-launch or reservation only), and may select various devices for the conference (e.g., other conferencing units, MCU's, external devices, etc.). The user may also specify various device settings, recurrences for the conference (e.g., every week, month, etc.), and/or settings for the conference.

Figure 5:
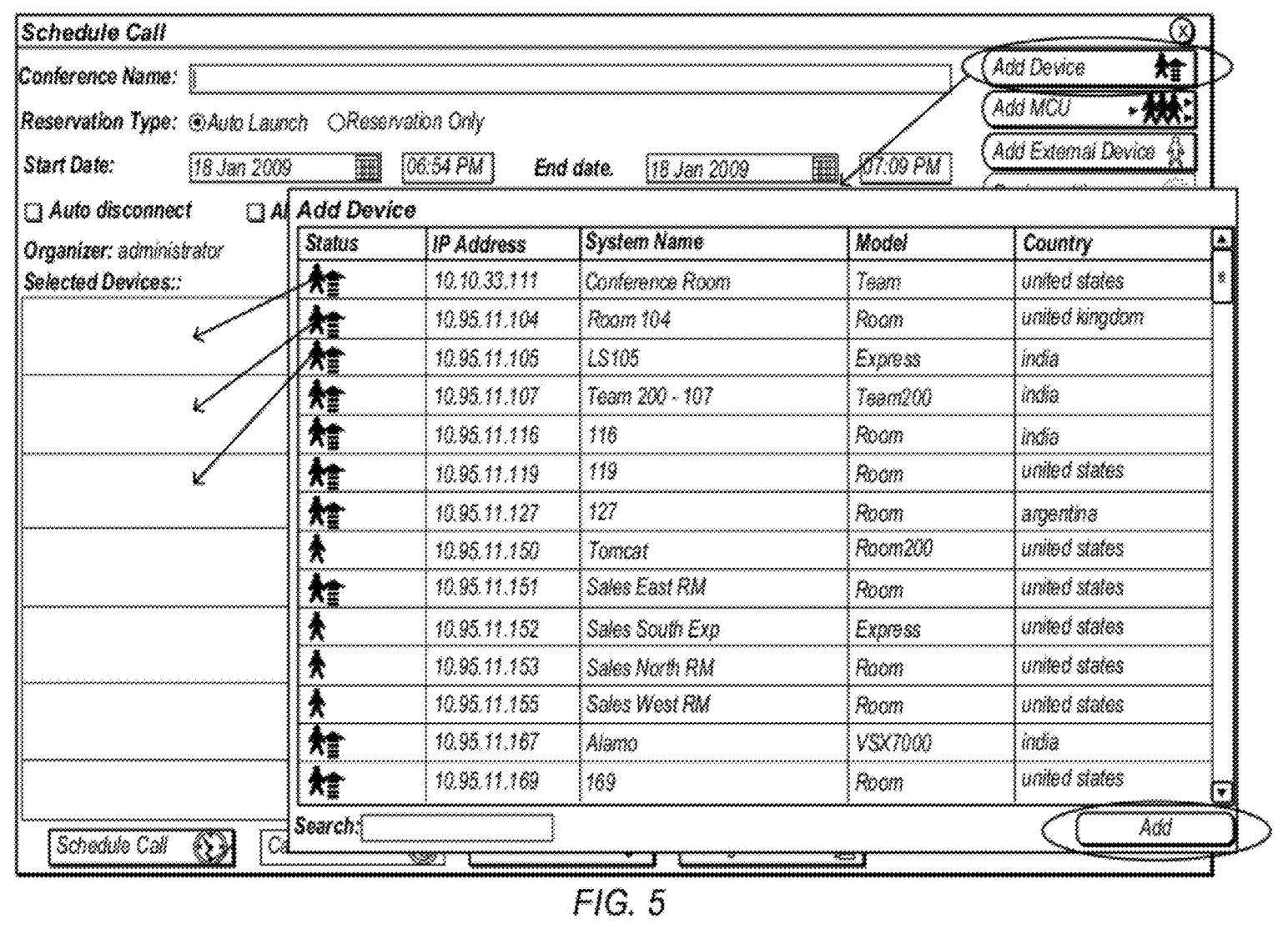

As shown in FIG. 5, the user may select various devices for the conference by selecting the "add device" button. Various information may be indicated about the device in this screen, including status information, IP address, system name, model, country, etc.

Figure 6:
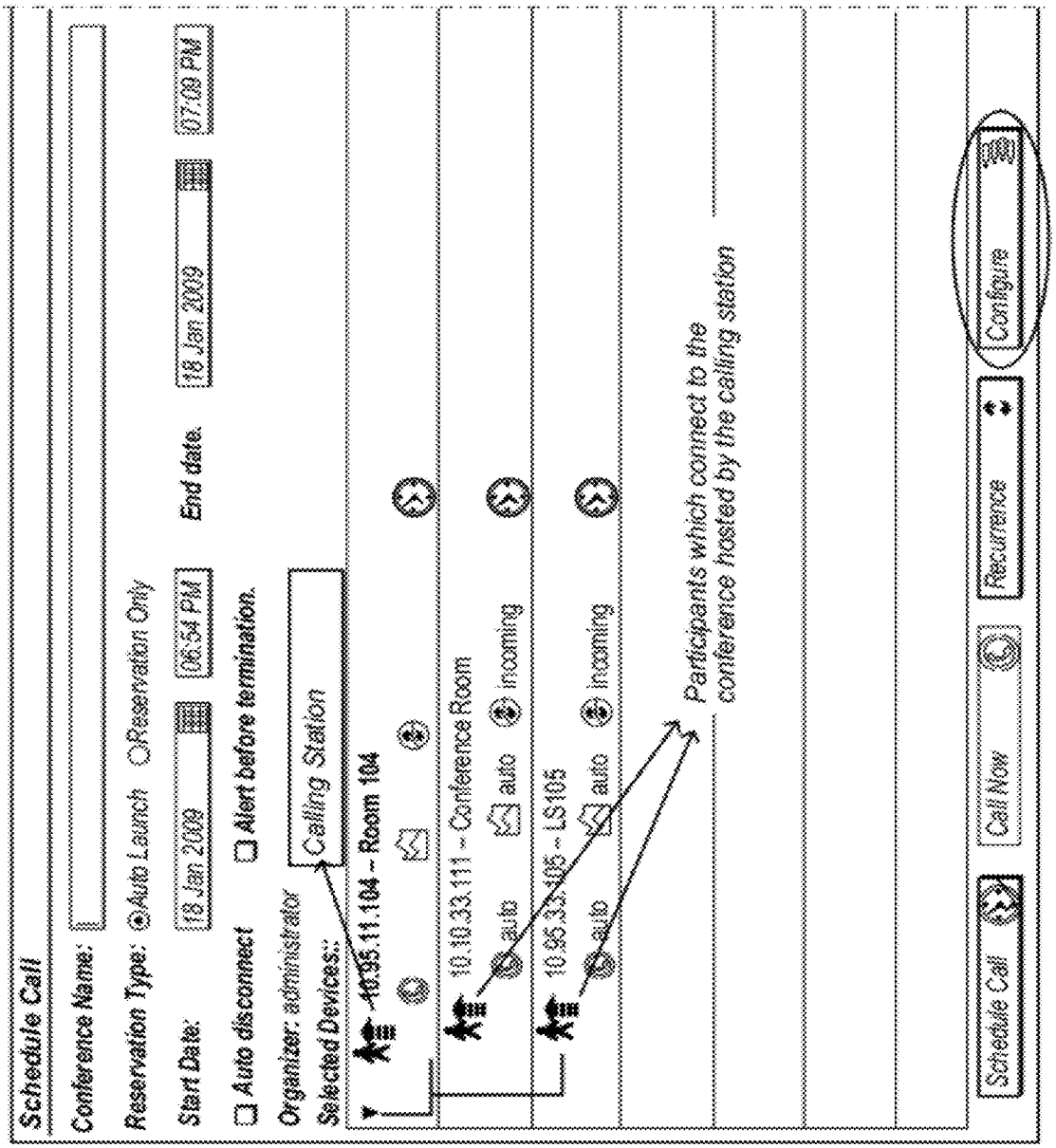

As shown in FIG. 6, after selecting three devices ("room 104", "conference room", and "LS105"), a configuration may be automatically generated, e.g., immediately after selecting the devices or after selecting the "configure" button indicated in FIG. 6. In this particular case, the device, "room 104", is selected as the control unit (displayed as the root node in the tree structure) and "conference room" and "LS105" are shown as leaf nodes of the tree structure, e.g., indicating that they are controlled by the device "room 104". Thus, the provided tree structure allows for visualization of the entire configuration for the conference (e.g., the network of selected devices) as it will be when the conference is actually performed.

Note that the administrator or user may have the flexibility to drag a desired participant or device and make that device the root node or control unit of the configuration. Thus, the provided configuration may be overridden by the user's choices. Additionally, selecting the configure button may result in the system regenerating or rearranging the tree structure with different configurations, e.g., with different endpoints acting as the host or control unit. This may allow the user to experiment with different combinations and select the one best suited for the current call. However, the system may not allow the user to modify the configuration to create non-viable options, e.g., where critical (or possibly any) conflicts exist, as desired.

Furthermore, each leaf participant or device may be able to dictate the kind of connection that they are able to perform (or otherwise desire) with the particular control unit. In various embodiments, the depth of the tree structure can be specified for any pre-configured limit, e.g., so that latency issues do not hurt the overall conference experience. Finally, the same (or a similar) user interface may be used when the conference is launched. Accordingly, the actual state of each device (e.g., dialing, incoming call, ringing, etc.) may be visualized within the scope of the tree UI so that accurate information about the ongoing process is available to the administrator and/or to some or all of the participants of the conference.

Figure 7:
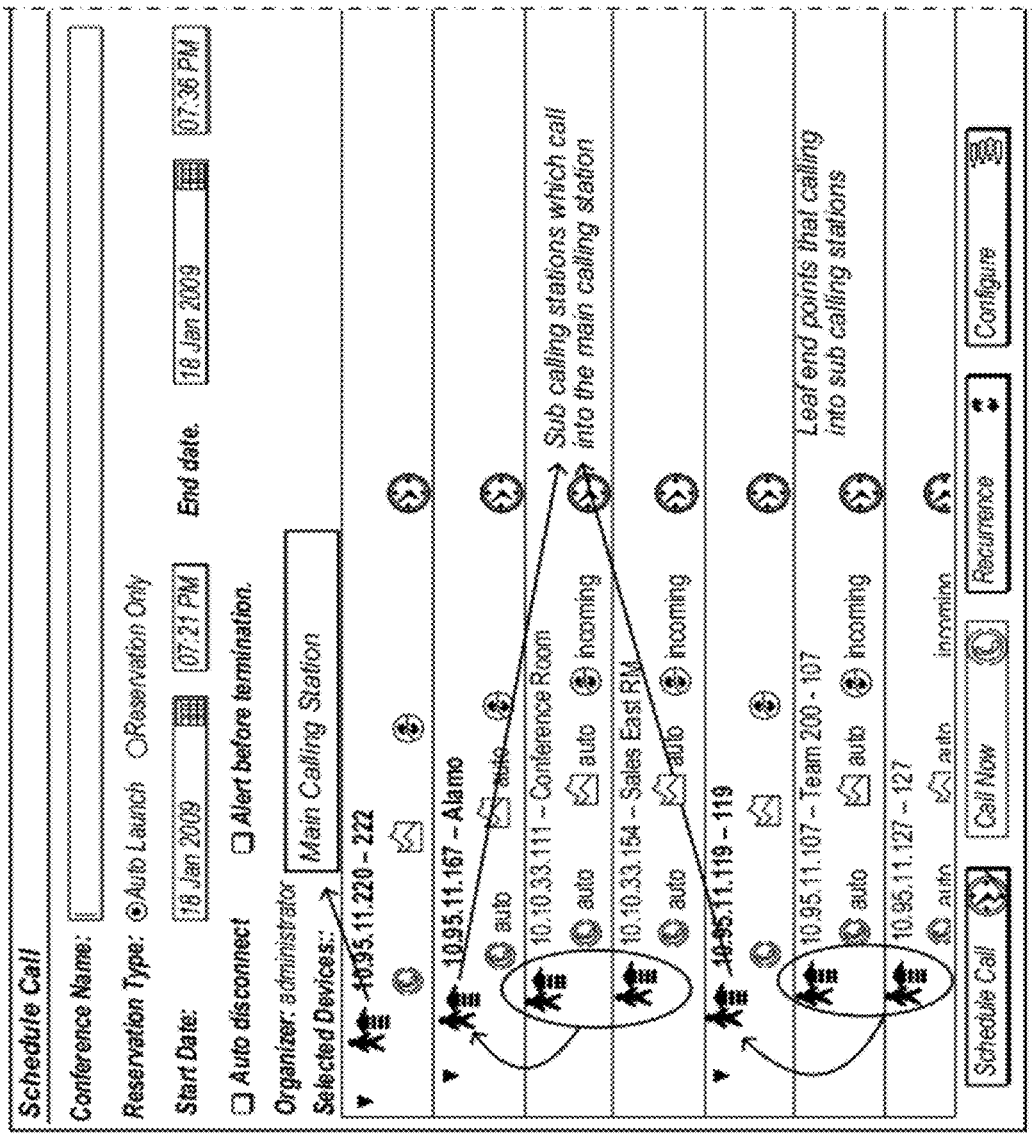

FIG. 7 illustrates a different configuration corresponding to a different selection of devices. As shown, the devices "222", "Alamo", "Conference Room", "Sales East RM", "119", "Team 200-107" and "127" have been selected. In this case, the automatically generated configuration has selected "222" as the control unit and "Alamo" and "119" as sub calling stations which call into the main calling station (i.e., the control unit 222). Each leaf device calls into its corresponding sub calling station, as shown. Thus, as more devices are added into the schedule, complex configurations may be generated and/or displayed for the user. More particularly, the system (or the user) may be able to generate or modify the configuration so that all interested parties can be a part of the conference. Similar to above, the user may be able to modify any of the nodes (i.e., the devices) of the conference (or properties) simply be selecting and moving (e.g., dragging and dropping) or modifying the nodes.

Particularly addressing the subcalling stations depicted in FIG. 7, by using available control unit abilities of the sub calling stations, even when a main calling station cannot host all participants or devices directly, the configuration allows the conference to be performed with the same functionality. In other words, these subcalling stations allows the system to operate as if each device were connected to the main calling station directly.

FIG. 8 illustrates a displayed configuration which indicates various conflicts. In this case, the devices "107", "LS105", and "Room 104" have scheduling conflicts with the scheduled conference, as indicated by the circled icons with x's on a clock. However, it should be noted that conflicts may be indicated for various other conditions, e.g., protocols chosen for a video connection, bandwidth, unsupported encryption, etc. In the case of a conflict (such as the scheduling conflict shown in FIG. 8), the user may simply be able to select (e.g., by clicking) the visualized conflict or error and allow the user to fix the conflict. For example, in for the scheduling conflict above, the user may be able to select a new device (e.g., which may be suggested by the system to aid the user, e.g., to pick a similar configuration device as the one which is unavailable) or move the schedules to a different time, e.g., so that the currently scheduled conference is scheduled as a priority.

Figure 9:
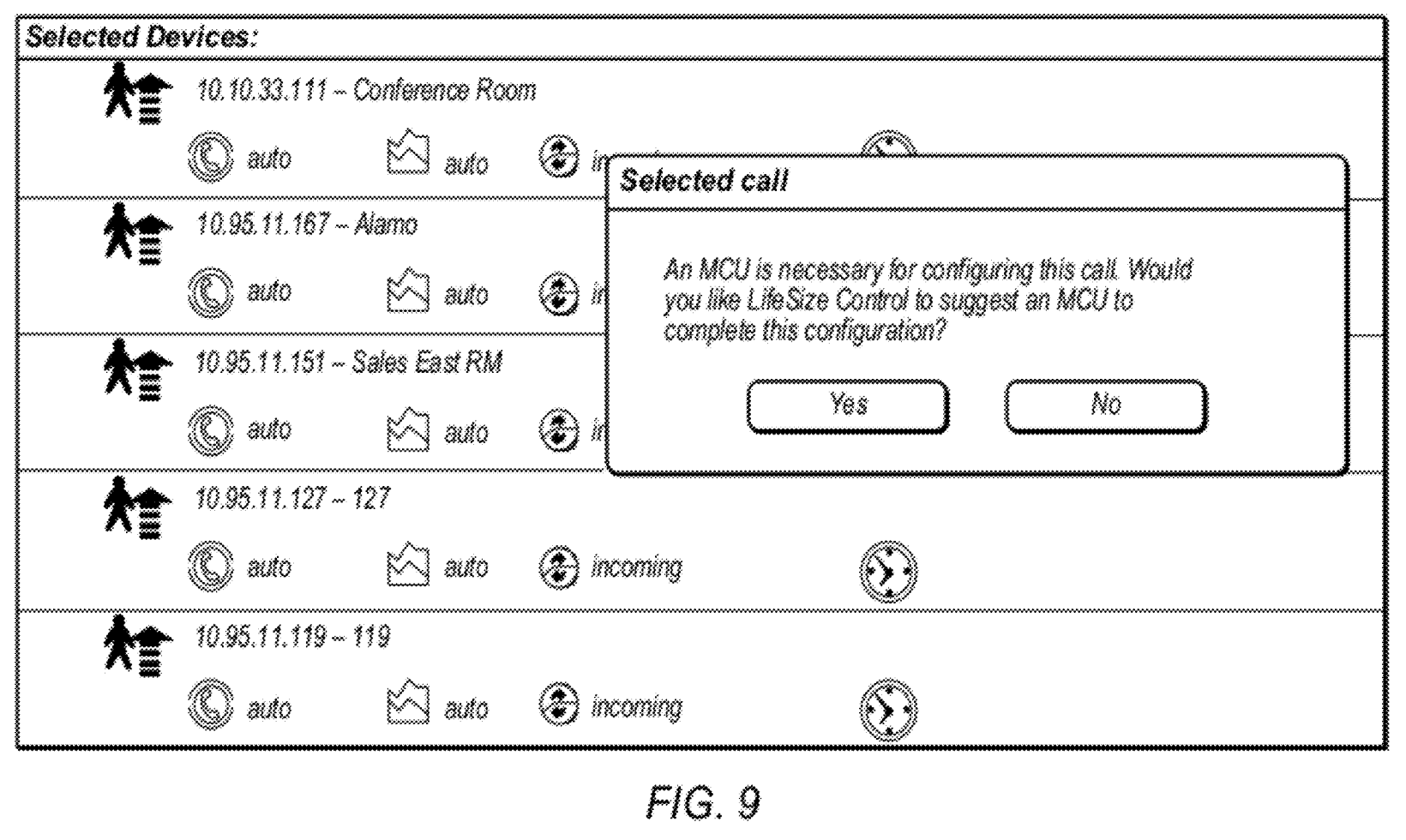

FIG. 9 illustrates a suggestion for a scheduled call. In this case, the system has detected that an MCU (or control unit) has not been selected for a particular call. As shown, the message states: "An MCU is necessary for configuring this call. Would you like LifeSize Control to suggest an MCU to complete this configuration?". Accordingly, if the user selects "yes", the system may automatically suggest a control unit for the conference or call. Thus, the system may detect critical errors or otherwise indicate that the selected devices cannot perform the scheduled call, and may be able to fix the error in response to user input.

In various embodiments, the control unit offered by the system may be based on an control unit affinity setting which may be associated by the user or via an automatic learning mechanism of the system based on the history of calls made between the selected devices. Each device may be automatically aligned under control units to which they have an affinity. Additionally, or alternatively, several control units may be used or suggested in order to achieve the requested or required port capacity, e.g., by placing them as intermediate nodes in the configuration.

Figure 10:
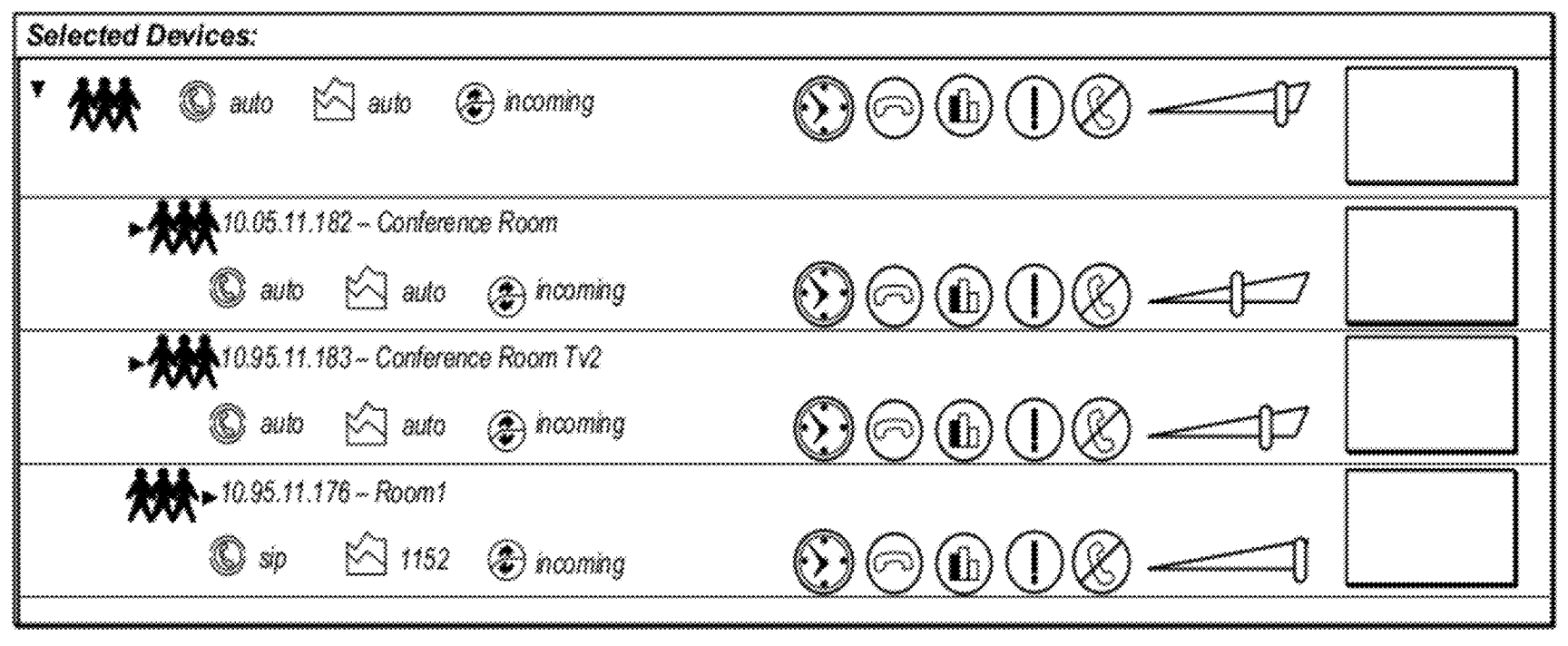

FIG. 10 illustrates an exemplary configuration where three devices 6("conference room", "conference room tv2" and "room1") are leaf nodes in the configuration. As shown, beside each of the selected devices, various icons may indicate information or settings of the device, e.g., scheduling, data conferencing, phone, video, volume controls, and an icon (possibly from a live feed) indicating the participant. This interface may be used during the conference, e.g., to provide statistics of the ongoing call at an individual device level. Additionally, during a conference, when a participant drops off from the call, the red "hang up" button may be turned into a green "reconnect" button which may be used to reconnect the device to the conference.

Figure 11:
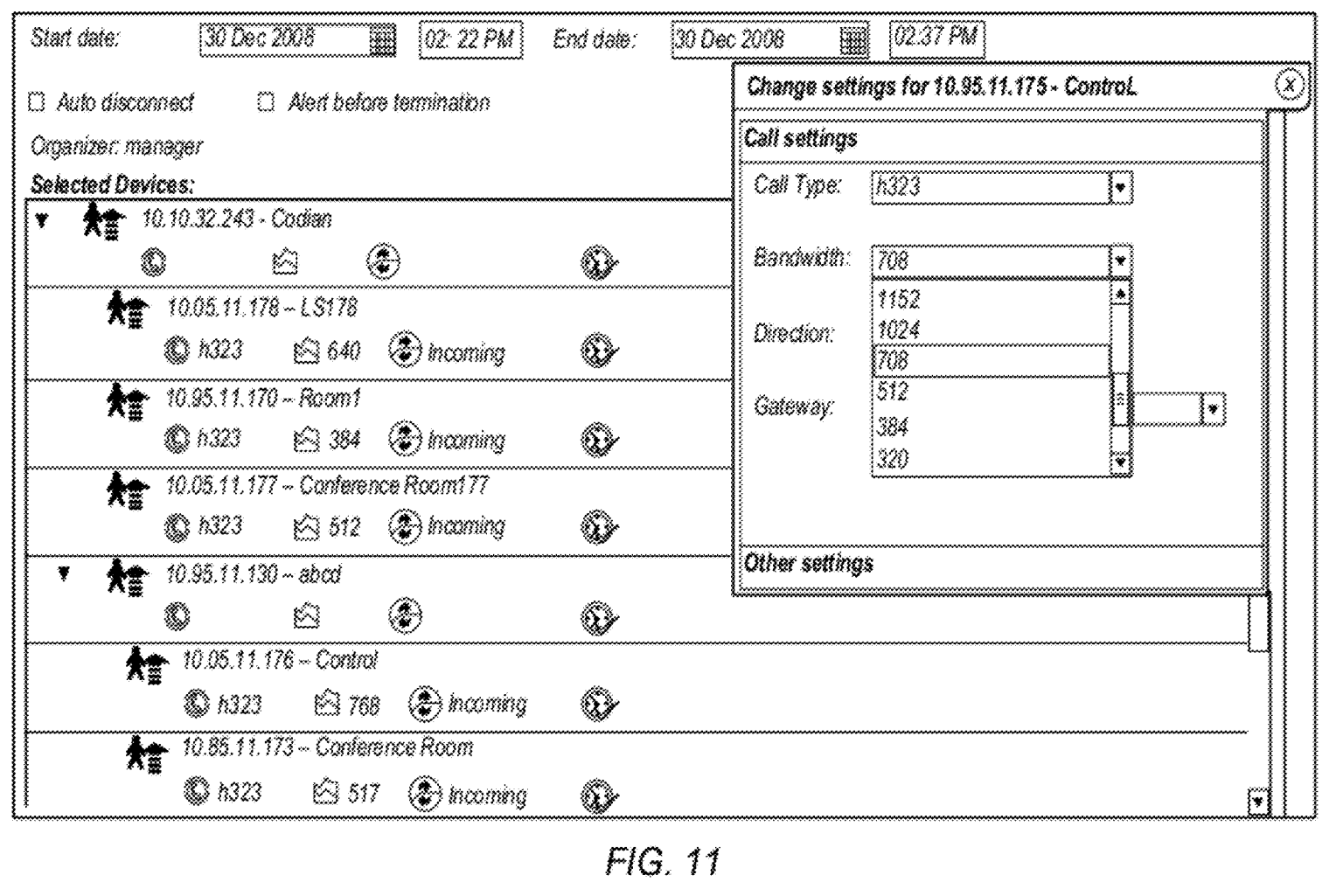

FIG. 11 illustrates an exemplary GUI where a user may change settings for the "Control" device. In this case, the user may change the "call type", "bandwidth", "direction", "gateway", and "other settings", as desired.

Figures 12, 13:
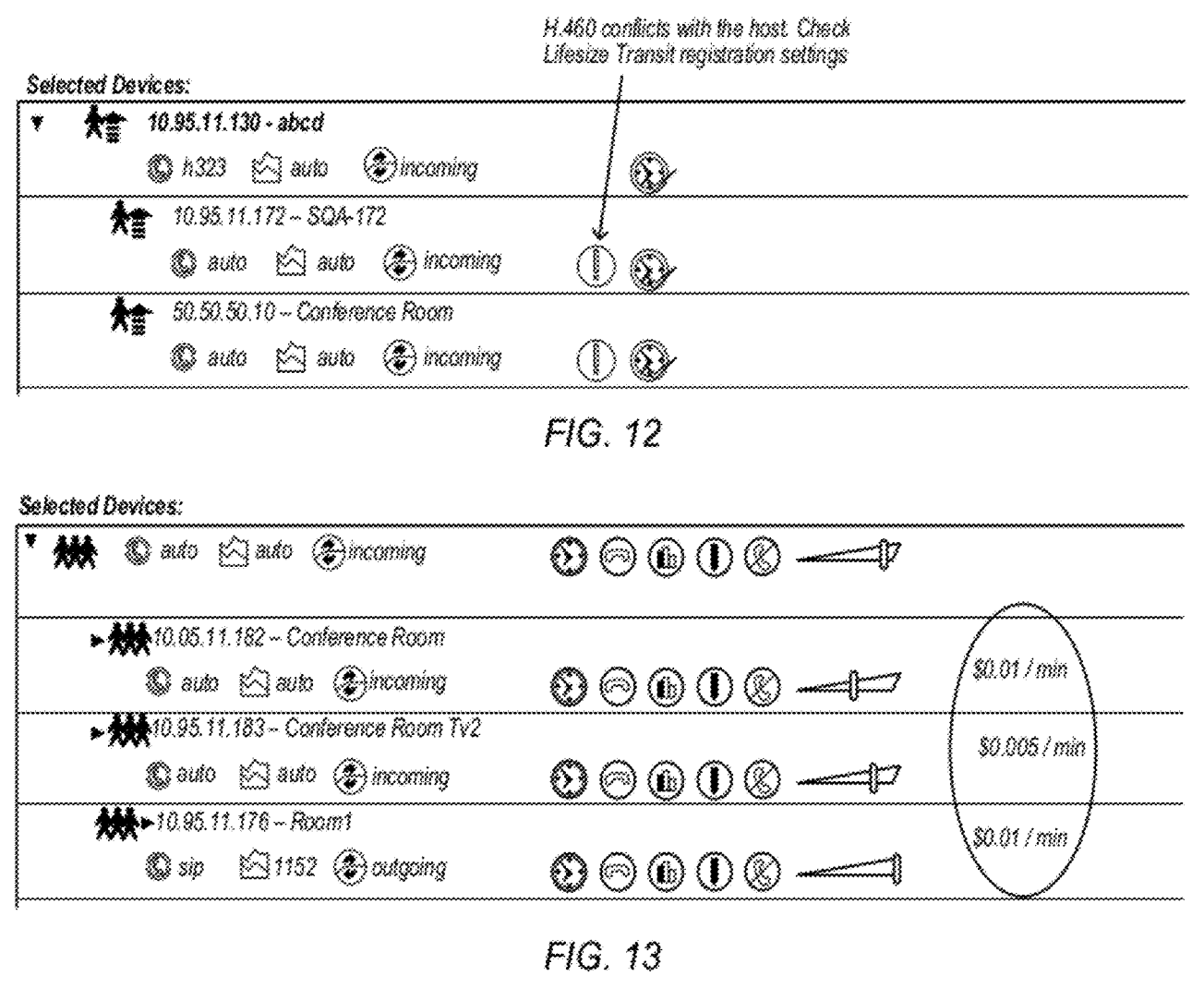

FIG. 12 illustrates an exemplary configuration diagram where the indicated icon indicates a conflict with the host. In this case the devices "SQA-172" and "Conference Room" are not compatible with H.460 encoding. Thus, such an interface may be used to resolve conflicts, e.g., an H.460 conflict between participating devices.

FIG. 13 illustrates an exemplary configuration diagram where charging information is displayed beside corresponding devices. In this case, "conference room" will cost $0.01 per minute, "conference room tv2" will cost $0.005 per minute, and "Room1" will cost $0.01 per minute. Other costing information may also be provided to the user. For example, the system may indicate that it may be better to us a gateway which is in a neutral location rather than inbuilt ISDN capability because of costing issues.

Figure 14:
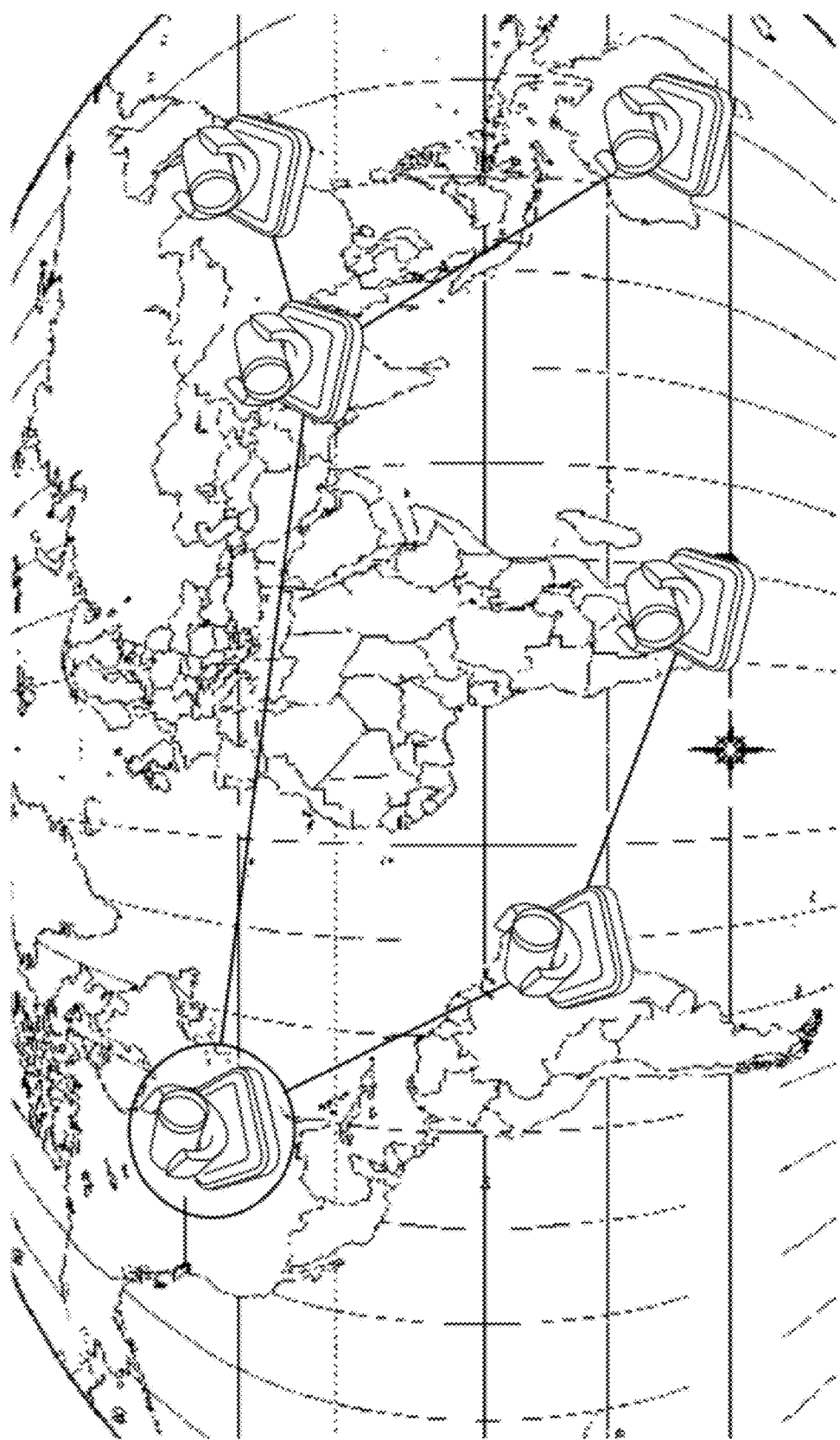

Finally, FIG. 14 illustrates a diagram that indicates various different positions of the different devices on the globe, thereby indicating physical location information of the devices/participants. As shown, the conference may include participants from North America, South America, Africa, India, South East Asia, and Australia.

Advantages

As described above, the systems and methods described above allow an administrator or end user to intuitively assess the multiple available optimal conference configurations for a chosen set of end points and choose the best among them. The method also allows for an intuitive drag-and-drop method of building a conference schedule that lets the user indicate to the scheduling software the kind of configuration that is needed for the situation at hand. Additionally, the error feedback mechanism described may provide for instant feedback to the user about the location/type/remedy to the conflicts among the end points.

In particular, the above-described method may provide many advantages over solutions in the prior art. For example, by providing the user-friendly configuration for display, scheduling a conference may be much more convenient and intuitive than previously available. Additionally, while scheduling the meeting (and possibly during the conference itself), the method may allow for an advanced feedback mechanism to allow the user to quickly understand and modify configurations to suit his needs.

Additionally, current conference schedulers are not well equipped to handle or indicate scenarios involving multiple hosts for a single conference (e.g., who connects to whom and how).

Further, the present method allows for efficient and painless alterations of configurations, and do not require an administrator to tediously re-organize end points to arrive at one of the several optimal configurations available. Further, the user may be able to open a previous configuration or tree structure and make necessary modifications to schedule a new conference.

Additionally, prior systems did not allow for the automatic determination and/or redeterminations of such configurations, as described herein. Thus, the user is not required to have an intimate knowledge of the network of conferencing devices using the above-described method.

Finally, prior systems did not indicate incompatibilities, version mismatches, unsupported protocol choices, unsupported dialing configurations to the user in an intuitive manner, thereby allowing the administrator to take immediate action. Thus, by visualizing the entire scenario in a convenient manner, an administrator may more intuitively configure a conference and resolve conflicts, such as those indicated above.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A non-transitory computer readable memory medium comprising program instructions for determining a configuration for a videoconference, wherein the program instructions are executable to:
  receive user input specifying at least three videoconferencing units for use in the videoconference, wherein each videoconferencing unit corresponds to a respective, different videoconferencing location;
  automatically determine a configuration of the at least three videoconferencing units for the videoconference, wherein the configuration is automatically determined based on the specified at least three videoconferencing units, wherein the configuration specifies usage of the at least three videoconferencing units during the videoconference, wherein the configuration specifies a first videoconferencing unit of the at least three videoconferencing units as a control unit, and wherein, in automatically determining the configuration, the program instructions are executable to:
    obtain information regarding capabilities of each of the at least three videoconferencing units; and
    create the configuration based on the capabilities of each of the at least three videoconferencing units; and
  display the configuration on a display device.

2. The non-transitory computer readable memory medium of claim 1, wherein said displaying the configuration comprises:
  displaying the first videoconferencing unit as a root node of the tree structure; and
  displaying one or more other videoconferencing units of the at least three videoconferencing units as leaf nodes of the tree structure.

3. The non-transitory computer readable memory medium of claim 1, wherein the program instructions are further executable to:
  receive user input to generate a different configuration; and
  automatically determine a different configuration of the at least three videoconferencing units for the videoconference.

4. The non-transitory computer readable memory medium of claim 1, wherein the program instructions are further executable to:
  receive user input specifying a second videoconferencing unit of the at least three videoconferencing units as the control unit.

5. The non-transitory computer readable memory medium of claim 1, wherein the program instructions are further executable to:
  provide status information during the videoconference regarding each of the at least three videoconferencing units.

6. The non-transitory computer readable memory medium of claim 1, wherein said displaying the configuration comprises indicating cost information for the configuration.

7. The non-transitory computer readable memory medium of claim 1, wherein said displaying the configuration comprises indicating physical proximity information for at least a subset of the at least three videoconferencing units.

8. The non-transitory computer readable memory medium of claim 1, wherein said displaying the configuration comprises indicating schedule conflicts of participants of the videoconference.

9. A method for determining a configuration for a conference for a plurality of participants, wherein at least a subset of the participants are geographically remote from each other, comprising:
  a computer system receiving input specifying at least three videoconferencing units for use in the conference, wherein each videoconferencing unit corresponds to a respective, different videoconferencing location;
  the computer system automatically determining a configuration of the at least three videoconferencing units for the conference, wherein the configuration is automatically determined based on the specified at least three videoconferencing units, wherein the configuration specifies usage of the at least three videoconferencing units during the conference, wherein the configuration specifies a first videoconferencing unit of the at least three videoconferencing units as a control unit, and wherein said automatically determining the configuration comprises:

obtaining information regarding capabilities of each of the at least three videoconferencing units; and creating the configuration based on the capabilities of each of the at least three videoconferencing units; and the computer system providing the configuration for display on a display device.

10. The method of claim 9, wherein said displaying the configuration comprises:

displaying the first videoconferencing unit as a root node of the tree structure; and displaying one or more other videoconferencing units of the at least three videoconferencing units as leaf nodes of the tree structure.

11. The method of claim 9, further comprising:

receiving user input to generate a different configuration; and automatically determining a different configuration of the at least three videoconferencing units for the conference.

12. The method of claim 9, further comprising:

receiving user input specifying a second videoconferencing unit of the at least three videoconferencing units as the control unit.

13. The method of claim 9, further comprising:

providing status information during the conference regarding each of the at least three videoconferencing units.

14. The method of claim 9, wherein said displaying the configuration comprises indicating cost information for the configuration.

15. The method of claim 9, wherein said displaying the configuration comprises indicating physical proximity information for at least a subset of the at least three videoconferencing units.

16. The method of claim 9, wherein said displaying the configuration comprises indicating schedule conflicts of participants of the conference.

17. A system for determining a configuration for a conference for a plurality of participants, wherein at least a subset of the participants are geographically remote from each other, :comprising: a processor; a display coupled to the processor; a memory medium coupled to the processor which stores program instructions for determining a configuration for a videoconference, wherein the program instructions are executable by the processor to:

receive user input specifying at least three plurality of devices videoconferencing units for use in the videoconference, wherein each videoconferencing unit corresponds to a respective, different videoconferencing location;

automatically determine a configuration of the plurality of devices at least three videoconferencing units for the videoconference, wherein the configuration is automatically determined based on the specified plurality of devices at least three videoconferencing units, wherein the configuration specifies usage of the plurality of devices at least three videoconferencing units during the videoconference, wherein the configuration specifies a first device videoconferencing unit of the plurality of devices at least three videoconferencing units as a control unit, and wherein, in automatically determining the configuration, the program instructions are executable to:

obtain information regarding capabilities of each of the plurality of devices at least three videoconferencing units; and create the configuration based on the capabilities of each of the plurality of devices at least three videoconferencing units; and display the configuration on the display.

18. The system of claim 17, wherein the program instructions are further executable to:

receive user input to generate a different configuration; and automatically determine a different configuration of the at least three videoconferencing units for the videoconference.

19. The system of claim 17, wherein the program instructions are further executable to:

receive user input specifying a second videoconferencing unit of the at least three videoconferencing units as the control unit.

20. The system of claim 17, wherein the program instructions are further executable to:

provide status information during the videoconference regarding each of the at least three videoconferencing units.

* * * * *

UNITED STATES PATENT AND TRADEMARK OFFICE
CERTIFICATE OF CORRECTION

PATENT NO. : 8,305,421 B2
APPLICATION NO. : 12/493862
DATED : November 6, 2012
INVENTOR(S) : Gautam Khot et al.

Page 1 of 1

It is certified that error appears in the above-identified patent and that said Letters Patent is hereby corrected as shown below:

In the Claims:

Column 13, Line 40 (Claim 17), please delete ":comprising:" and substitute -- comprising: --.

Signed and Sealed this
Twelfth Day of February, 2013

Teresa Stanek Rea
*Acting Director of the United States Patent and Trademark Office*